(12) United States Patent
Krstanovic et al.

(10) Patent No.: US 11,465,548 B1
(45) Date of Patent: Oct. 11, 2022

(54) LOAD RESTRAINT FASTENER FOR USE WITH DIFFERENT LOAD RESTRAINT ATTACHMENTS

(71) Applicant: Xtreme Manufacturing, LLC, Henderson, NV (US)

(72) Inventors: Risto Krstanovic, Henderson, NV (US); James Charles Masters, Henderson, NV (US); Jacob Wayne Adkins, Las Vegas, NV (US); Jeffrey Lee Eckhardt, Las Vegas, NV (US)

(73) Assignee: XTREME MANUFACTURING, LLC, Henderson, NV (US)

( * ) Notice: Subject to any disclaimer, the term of this patent is extended or adjusted under 35 U.S.C. 154(b) by 0 days.

(21) Appl. No.: 17/313,891

(22) Filed: May 6, 2021

(51) Int. Cl.
*B60P 7/08* (2006.01)
*B62D 33/02* (2006.01)

(52) U.S. Cl.
CPC ............ *B60P 7/0807* (2013.01); *B62D 33/02* (2013.01)

(58) Field of Classification Search
CPC ........ B60P 7/0807; B60P 7/0853; B60P 7/08; B60P 7/16; B62D 33/02
USPC ......... 410/106, 103, 100, 116, 97, 102, 107, 410/110, 129; 296/184.1
See application file for complete search history.

(56) References Cited

U.S. PATENT DOCUMENTS

| | | |
|---|---|---|
| 2,605,720 A | 8/1952 | Smith |
| 3,334,914 A | 8/1967 | Vierregger |
| 3,421,726 A | 1/1969 | Herbert |
| 3,572,755 A | 3/1971 | Baldwin |
| 3,865,048 A | 2/1975 | Wallace |
| 3,937,436 A | 2/1976 | Stewart |
| 4,253,785 A | 3/1981 | Bronstein |
| 4,257,570 A | 3/1981 | Rasmussen |
| 4,607,991 A | 8/1986 | Porter |
| 4,650,382 A | 3/1987 | Johnson |
| 4,796,942 A | 1/1989 | Robinson et al. |
| 4,812,093 A | 3/1989 | Millar, Jr. |
| 4,818,162 A | 4/1989 | Zukowski et al. |

(Continued)

FOREIGN PATENT DOCUMENTS

| | | |
|---|---|---|
| AT | 500579 B1 | 8/2006 |
| AU | 2013101439 A4 | 12/2013 |

(Continued)

*Primary Examiner* — D Glenn Dayoan
*Assistant Examiner* — Sunsurraye Westbrook
(74) *Attorney, Agent, or Firm* — Armstrong Teasdale LLP (57) ABSTRACT

A load restraint fastener for use with a plurality of load restraint attachments is described. The load restraint fastener includes a body. The body includes a substantially planar portion having a front face and an opposite rear face. The substantially planar portion defines an opening and includes a first receiving portion having a receiving surface. The first receiving portion also defines a first portion of the opening. The substantially planar portion includes, in addition, a second receiving portion having a receiving surface. The second receiving portion is spaced apart from the first receiving portion and symmetric with the first receiving portion about at least one axis of symmetry. The second receiving portion defines a second portion of the opening. The body also includes a projecting portion having a receiving surface. The projecting portion extends outwardly from the rear face of the substantially planar portion.

20 Claims, 11 Drawing Sheets

(56) References Cited

U.S. PATENT DOCUMENTS

| | | |
|---|---|---|
| 4,842,458 A * | 6/1989 | Carpenter .............. B60P 7/083 242/379.2 |
| 5,139,375 A | 8/1992 | Franchuk |
| 5,326,203 A | 7/1994 | Cockrell |
| 5,378,094 A | 1/1995 | Martin et al. |
| 5,419,603 A | 5/1995 | Kremer et al. |
| 5,443,341 A | 8/1995 | Hamilton |
| 5,445,482 A | 8/1995 | Davis |
| 5,494,388 A | 2/1996 | Stevens |
| 5,560,576 A | 10/1996 | Cargill |
| 5,676,508 A | 10/1997 | Weicht |
| 5,807,045 A | 9/1998 | Profit |
| 5,823,725 A | 10/1998 | Goodwin |
| 5,827,023 A | 10/1998 | Stull |
| 5,836,060 A | 11/1998 | Profit |
| RE36,073 E | 2/1999 | Kremer et al. |
| 6,039,520 A | 3/2000 | Cheng |
| 6,129,490 A | 10/2000 | Erskine et al. |
| 6,145,920 A | 11/2000 | Rasmussen |
| 6,286,884 B1 | 9/2001 | Speece |
| 6,350,089 B1 | 2/2002 | Fekavec |
| 6,390,744 B1 | 5/2002 | Parkins |
| 6,618,912 B1 | 9/2003 | Chang |
| 6,799,927 B2 | 10/2004 | Wheatley |
| 6,821,067 B1 | 11/2004 | Von Loehr |
| 6,824,341 B2 | 11/2004 | Ehrlich |
| 6,953,312 B1 | 10/2005 | Wheatley |
| 6,966,734 B2 | 11/2005 | Toteff |
| 6,969,219 B2 | 11/2005 | Speece et al. |
| 7,001,122 B2 | 2/2006 | Bommarito et al. |
| 7,080,966 B2 | 7/2006 | Roh |
| 7,090,449 B1 | 8/2006 | Hugg |
| 7,131,804 B2 | 11/2006 | Sawchuk |
| 7,147,417 B2 | 12/2006 | Priesgen |
| D540,244 S | 4/2007 | Racek |
| 7,219,951 B2 | 5/2007 | Rasmussen |
| 7,458,758 B2 | 12/2008 | Adams |
| 7,481,610 B1 | 1/2009 | Egigian |
| 7,578,645 B2 | 8/2009 | Terry et al. |
| 7,740,431 B1 | 6/2010 | Baker |
| 7,841,815 B1 | 11/2010 | Lane |
| 7,909,533 B2 * | 3/2011 | Quenzi .................. E01C 19/40 404/114 |
| 7,980,798 B1 | 7/2011 | Kuehn et al. |
| 7,997,839 B1 | 8/2011 | Gallegos et al. |
| 8,038,374 B2 | 10/2011 | Russell et al. |
| 8,272,821 B2 | 9/2012 | Digman |
| 8,393,838 B2 | 3/2013 | Plazek |
| 8,408,627 B2 | 4/2013 | Mann |
| 8,434,978 B2 | 5/2013 | Tardif et al. |
| 8,529,176 B2 | 9/2013 | Jutila et al. |
| 8,550,757 B2 | 10/2013 | Anderson et al. |
| 8,845,250 B1 | 9/2014 | Helms |
| 9,505,333 B2 | 11/2016 | Jobe |
| 9,610,884 B1 | 4/2017 | Howes et al. |
| 9,688,127 B2 | 6/2017 | Hemphill et al. |
| 9,707,883 B1 | 7/2017 | Stojkovic et al. |
| 9,884,578 B2 | 2/2018 | Stojkovic et al. |
| 9,884,580 B2 * | 2/2018 | Hemphill .............. B60P 7/0807 |
| 9,963,062 B1 | 5/2018 | Halls |
| 10,183,610 B2 | 1/2019 | Kloepfer et al. |
| 10,343,587 B2 | 7/2019 | Frazier |
| 10,377,294 B2 | 8/2019 | Lindquist |
| 10,406,964 B1 | 9/2019 | Thompson |
| 10,457,192 B1 | 10/2019 | Heimstra |
| 10,518,692 B2 | 12/2019 | Stojkovic et al. |
| 10,518,693 B2 | 12/2019 | Moua et al. |
| 10,647,243 B2 | 5/2020 | Williams et al. |
| 10,787,108 B2 | 9/2020 | Vollmering |
| 10,814,772 B2 | 10/2020 | Stojkovic et al. |
| 2002/0006317 A1 | 1/2002 | Hofmann et al. |
| 2002/0012576 A1 | 1/2002 | Anderson |
| 2002/0168242 A1 | 11/2002 | Lin |
| 2004/0253071 A1 | 5/2004 | Floe |
| 2005/0249568 A1 | 11/2005 | Gormly |
| 2006/0104739 A1 | 5/2006 | Hamper |
| 2007/0207003 A1 | 9/2007 | Roh |
| 2008/0014041 A1 | 1/2008 | Randazzo et al. |
| 2008/0038075 A1 | 2/2008 | Aftanas |
| 2008/0089757 A1 | 4/2008 | Byard |
| 2009/0274530 A1 | 11/2009 | Goodfellow et al. |
| 2011/0140605 A1 | 6/2011 | Mann |
| 2013/0309038 A1 | 11/2013 | Starr |
| 2014/0110520 A1 | 4/2014 | Hampson |
| 2014/0286724 A1 | 9/2014 | Grone |
| 2015/0345099 A1 | 12/2015 | Griffiths |
| 2017/0113595 A1 * | 4/2017 | Hemphill .............. B60P 7/0853 |
| 2017/0120960 A1 | 5/2017 | Whitmill |
| 2017/0144520 A1 | 5/2017 | Hemphill et al. |
| 2018/0361907 A1 | 12/2018 | Graves et al. |
| 2020/0139875 A1 | 5/2020 | Carpenter |
| 2020/0180495 A1 | 6/2020 | Wheeler |

FOREIGN PATENT DOCUMENTS

| | | |
|---|---|---|
| CA | 2178224 C | 7/1996 |
| CN | 203439148 U | 2/2014 |
| CN | 105253065 A | 1/2016 |
| CN | 206824682 U | 1/2018 |
| CN | 207043634 U | 2/2018 |
| CN | 111470200 A | 7/2020 |
| DE | 4000722 A1 | 7/1991 |
| DE | 4107304 C2 | 9/1992 |
| DE | 10322569 A1 | 12/2004 |
| EP | 1044846 A1 | 10/2000 |
| EP | 2174904 A2 | 4/2010 |
| GB | 2400887 A | 10/2004 |
| KR | 2020123456 A | 10/2020 |
| SE | 517462 C2 | 6/2002 |
| WO | 2000013936 A1 | 3/2000 |

\* cited by examiner

FIG. 11

LOAD RESTRAINT FASTENER FOR USE WITH DIFFERENT LOAD RESTRAINT ATTACHMENTS

FIELD

The field of the disclosure relates generally to load restraining equipment, and more particularly to a load restraint fastener, such as a tie-down fastener, capable of universal use with different shapes and types of load restraint attachments.

BACKGROUND

In the construction industry, as well as a variety of other manufacturing, production, and related industries, it is often necessary to transport heavy objects or loads, such as heavy machinery and construction materials, from one location to another. Typically, transport is accomplished using vehicles of many types, such as for example, trucks, airplanes, boats, and trains. However, before a load can be safely transported, it is commonly necessary to restrain the load, such as by securing the load using one or more restraints. Known restraints may include, for example, straps, cables, ropes, chains, and the like. In many instances, restraints, such as straps, may include one or more attachments at their respective ends, such as hooks, chain-links, ratchet mechanisms, clamps, and/or other similar attachments.

In some transportation and load hauling applications, one or more tie-downs may be provided on or near a platform intended to support the load. For example, a flatbed truck may include a trailer that includes one or more tie-downs, to which an operator of the truck may attach one or more restraints prior to transporting the load. Commonly, however, the tie-downs available to the operator are only rudimentary or simple-shaped objects, and are not capable of interoperation with different types of load restraint attachments. For example, although the tie-downs may include simple prongs or lateral handles, tie-downs are generally not capable of engagement and/or interoperation with different types of restraint attachments. As a result, the usefulness of at least some known traditional tie-downs may be limited, as many known tie-downs cannot support the attachment of multiple restraint attachments, let alone the attachment of restraints, such as straps and cables, that may include different types of attachments at their respective ends.

A universal load restraint fastener, or tie-down, capable of engagement and interoperation with many different types of restraint attachments, such as flat-hook and other-shaped hook attachments, chains, clamps, and the like is desirable. In addition, a load-bearing structure, such as a trailer bed, fitted with one or more such universal load restraint fasteners is also desirable.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION

In one aspect, a tie-down fastener for use with a plurality of load restraint attachments is described. The tie-down fastener includes a body. The body includes a substantially planar portion having a front face and an opposite rear face. The substantially planar portion defines an opening and includes a first receiving portion having a receiving surface. The first receiving portion also defines a first portion of the opening. The substantially planar portion includes, in addition, a second receiving portion having a receiving surface. The second receiving portion is spaced apart from the first receiving portion and symmetric with the first receiving portion (e.g., in a mirrored relationship) about at least one axis of symmetry. The second receiving portion defines a second portion of the opening. The first receiving portion and the second receiving portion are arranged to receive at least a first kind of restraint attachment (e.g., one or more chain-links). The body also includes a projecting portion having a receiving surface. The projecting portion extends outwardly from the rear face of the substantially planar portion. The projecting portion is arranged to receive at least one second kind of restraint attachment (e.g., a flat or planar hook, a tubular or other-shaped hook, and the like).

In another aspect, a load restraint fastener is described. The load restraint fastener includes a body defining an opening arranged to receive at least one type of load restraint attachment. The body includes a first receiving portion having a first end, a second end, and a receiving surface extending therebetween, where the first receiving portion defines a first portion of the opening. The body also includes a second receiving portion having a first end, a second end, and a receiving surface extending therebetween, where the second receiving portion is spaced apart from the first receiving portion and defines a second portion of the opening. The body includes, in addition, a first connecting portion extending between and connecting the first end of the first receiving portion and the first end of the second receiving portion. Moreover, the body includes a second connecting portion extending between and connecting the second end of the first receiving portion and the second end of the second receiving portion, where the second connecting portion is spaced apart from the first connecting portion. The body also includes a projecting portion coupled to the second portion and extending away from the second portion. The projecting portion includes a first end, a second end, and a receiving surface extending therebetween.

In yet another aspect, a load-bearing platform is described. The load-bearing platform includes a bed arranged to carry a load, and a first elongate member extending relative to the bed, where the first elongate member includes at least a first tie-down fastener. The first tie-down fastener includes a body. The body includes a substantially planar portion having a front face and a rear face. The substantially planar portion defines an opening and includes a first receiving portion having a receiving surface. The first receiving portion also defines a first portion of the opening. The substantially planar portion includes, in addition, a second receiving portion having a receiving surface. The second receiving portion is spaced apart from the first receiving portion and symmetric with the first receiving portion about at least one axis of symmetry. The second receiving portion defines a second portion of the opening.

The body also includes a projecting portion having a receiving surface. The projecting portion extends outwardly from the rear face of the substantially planar portion.

DETAILED DESCRIPTION

A load restraint fastener for use with a variety of load restraint attachments, such as flat- and other-shaped hook attachments, chain-link attachments, and the like, is described. In the exemplary embodiment, the load restraint fastener may include a substantially planar portion that may include an opening defined therein and a projecting portion that extends from a rear or bottom surface of the planar portion. The fastener may include a variety of receiving surfaces, notches, and/or other surface features, each of which may individually and/or in combination with one or more other surface features, facilitate engagement with, and securing of, one or more of the plurality of load restraint attachments.

Accordingly, the load restraint fastener described herein may be used in association with any suitable load-bearing structure, such as a trailer and/or truck bed, to provide a tie-down or restraint securing location. In addition, a plurality of load restraint fasteners may be coupled to a load-bearing structure to provide a variety of restraint attachment connection points, each of which may facilitate coupling a load restraint, such as a strap, a cable, a rope, a chain, and/or any other restraint type that includes one or more of the load restraint attachments described herein. For example, in at least one embodiment, a pair of load restraint fasteners may be used in a spaced-apart relationship to one another and separated by a load-bearing platform, such as a trailer bed. A load restraint, such as a strap, including load restraint attachments, such as hooks, flat-hooks, and/or chain-links, coupled to the ends thereof, may be secured between the pair of load restraint fasteners to further secure a load relative to the load restraint on the trailer bed.

The load restraint fastener described herein is thus universally usable with a variety of types of load restraint attachments. Likewise, the load restraint fastener described herein can be used with a wide variety of load bearing structures to secure loads on and/or relative to the structures, even in circumstances where different types of load restraint attachments are beneficial or otherwise available.

Exemplary technical effects and improvements include, but are not limited to the following: (i) providing a load restraint fastener that can be used with any of a variety of types of load restraint attachments, such as, but not limited to, flat-hook attachments, other-shaped hook attachments, such as tubular and other rectilinear hooks, chains and chain-links, and the like; (ii) providing a plurality of load restraint fasteners in association with a load-bearing structure, such as a trailer or trailer bed for use in securing a load on the structure; and (iii) providing a plurality of load restraint fasteners in association with the load-bearing structure for use in securing the load between load restraints, such as straps, cables, chains, and other ties, having different or varying types of load restraint attachments coupled thereto.

In the following specification and the claims, reference will be made to a number of terms, which may be used in conjunction with the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, values modified by a term or terms, such as "about" and "substantially", are not to be limited to the precise values specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Likewise, as used herein, spatially relative terms, such as "beneath," "below," "under," "lower," "higher," "above," "over," "rear," "front," "bottom," "top," and the like, may be used to describe one element or feature's relationship to one or more other elements or features as illustrated in the figures. It will be understood that such spatially relative terms are intended to encompass different orientations of the elements and features described herein both in operation as well as in addition to the orientations depicted in the figures. For example, if an element or feature in the figures is turned over, elements described as being "below" one or more other elements or features may be regarded as being "above" those elements or features. Thus, exemplary terms such as "below," "under," or "beneath" may encompass both an orientation of above and below, depending, for example, upon a relative orientation between such elements or features and one or more other elements or features.

Figure 1:
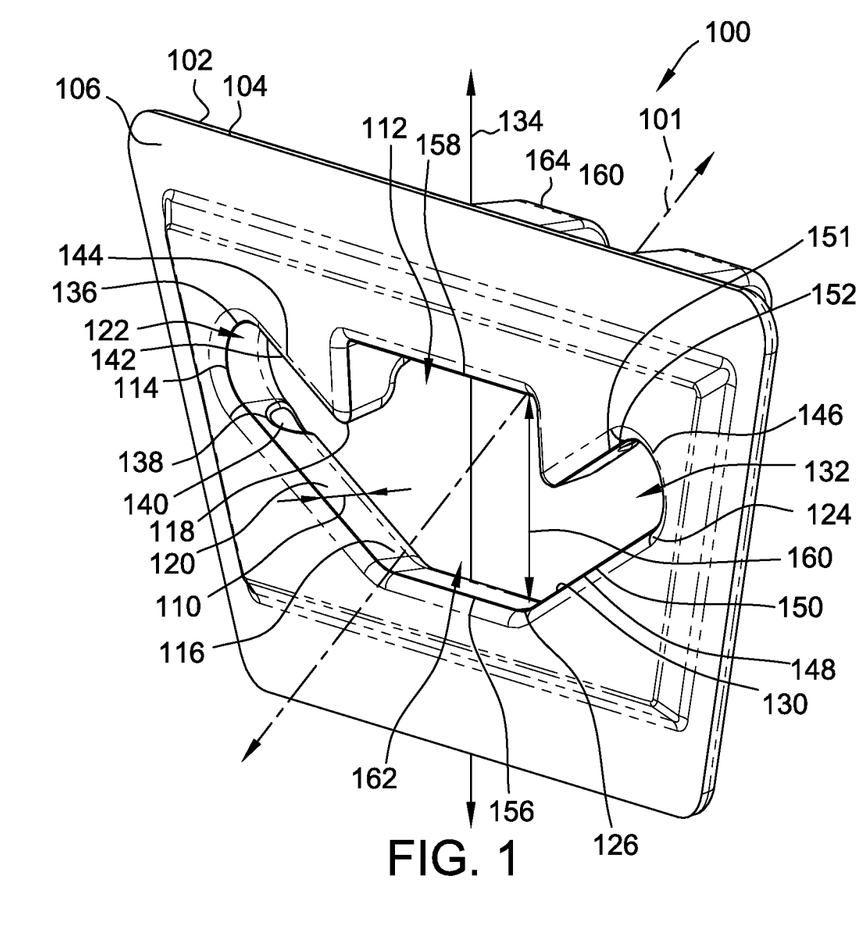
FIG. 1 is a top perspective view of an exemplary load restraint fastener that may be used with different shapes and types of load restraint attachments.
Figure 2:
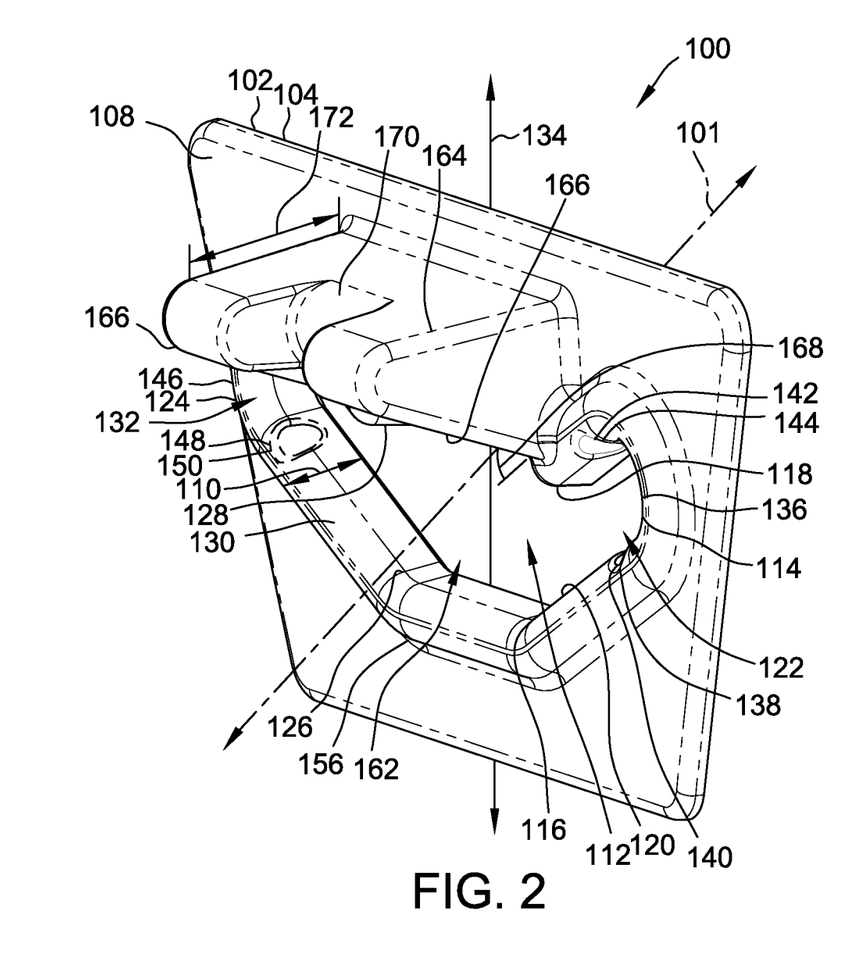
FIG. 2 is a bottom perspective view of the load restraint fastener shown in FIG. 1.

FIG. 1 is a top perspective view of an exemplary load restraint fastener 100 (or "tie-down fastener"), which may be used with different shapes and types or kinds of load restraint attachments (as described herein). FIG. 2 is a bottom perspective view of load restraint fastener 100. Accordingly, in the exemplary embodiment, load restraint fastener 100 includes a body 102. In at least some implementations, body 102 is manufactured from any suitable plastic material, any composite material (e.g., a durable and/or high-strength plastic composite), any metal or metal alloy, and/or any other material suitable for use as a tiedown, such as any other high strength or durable material capable of restraining a heavy load. In some embodiments, body 102 is an integral or monolithic component (e.g., a cast or 3D printed workpiece). In other embodiments, body 102 includes components integrally coupled or formed together, and the like. It will thus be appreciated that a variety of materials and manufacturing techniques may be used to create load restraint fastener 100.

In the exemplary embodiment, body 102 includes a substantially planar portion 104 having a front face 106, a rear face 108, and a thickness 110 defined therebetween. A centerline 101 may extend through body 102, as shown. In some implementations, one or more dimensions of body 102, such as thickness 110, may be varied during manufacturing to accommodate a variety of different load requirements. Likewise, body 102 may be variously sized depending upon load requirements, a size of a load-bearing platform (e.g., a truck trailer) to which load restraint fastener 100 is intended to be coupled (as described herein), and the like. It will therefore be appreciated that the dimensions of load restraint fastener 100 may also be variably selected during manufacture to suit a given application.

In the exemplary embodiment, body 102 also includes an opening 112 defined therein. Opening 112 may be shaped and sized to receive a variety of load restraint attachments, such as, but not limited to, flat hook (or planar hook) attachments, tubular and/or other shaped hook attachments, chain-link attachments, clamps, and the like. To accommodate various load restraint attachments, in the exemplary embodiment, body 112 includes a first receiving portion 114 that includes a first end 116, a second end 118, and a receiving surface 120 extending between ends 116 and 118. In the exemplary embodiment, first receiving portion 114 defines a first portion 122 of opening 112.

Similarly, in the exemplary embodiment, body 102 includes a second receiving portion 124. Similar to first receiving portion 114, second receiving portion 124 includes a first end 126, a second end 128, and a receiving surface 130 extending therebetween. In the exemplary embodiment, second receiving portion 124 likewise defines a second portion 132 of opening 112. In addition, as shown, in the exemplary embodiment, second receiving portion 124 is symmetric (e.g., in a mirrored relationship) with first receiving portion 114 about one or more axes of symmetry, such as a vertical axis of symmetry 134. Alternatively, first receiving portion 114 and/or second receiving portion 124 may extend away from axis of symmetry 134 at any acute angle less than or equal to approximately 90°. In other embodiments, however, first receiving portion 114 and/or second receiving portion 124 may be oriented relative to axis of symmetry 134 at any of a variety of other suitable angles, including, but not limited to right angles and/or obtuse angles less than approximately 180°.

In addition to these features, in at least some implementations, first receiving portion 114 includes a first arcuate segment 136 (or "recurved portion") extending at least partially between first end 116 and second end 118. A first notch 138 may be formed in a first part 140 of first arcuate segment 136. A second notch 142 may be formed opposite first notch 138 in a second part 144 of first arcuate segment 136. Together, first notch 138 and second notch 142 may cooperate to receive and engage a chain-link (as described herein) of a load restraint attachment. First notch 138 and second notch 142 may extend from rear face 108 some distance into thickness 110 without reaching front face 106, such that a chain-link inserted between notches 138 and 142 is restrained and/or prevented from sliding all the way through first arcuate segment 136.

Similarly, in at least some implementations, second receiving portion 124 may include a second arcuate segment 146 (or "recurved portion") extending at least partially between first end 126 and second end 128. A first notch 148 may be formed in a first part 150 of second arcuate segment 146. A second notch 152 may be formed opposite first notch 148 in a second part 154 of second arcuate segment 146. Together, first notch 148 and second notch 152 may cooperate to receive and engage a chain-link (described in additional detail below) of a load restraining attachment. First notch 148 and second notch 152 may extend from rear face 108 some distance into thickness 110 without contacting or extending through front face 106, such that a chain-link inserted between notches 148 and 152 is restrained and/or prevented from sliding through second arcuate segment 146 (described in additional detail below).

In the exemplary embodiment, body 102 also includes a first connecting portion 156 that extends between and connects first end 116 of first receiving portion 114 and first end 126 of second receiving portion 124. Likewise, body 102 may include a second connecting portion 158 that extends between and connects second end 118 of first receiving portion 114 and second end 128 of second receiving portion 124. As shown, first connecting portion 156 may be spaced apart from second connecting portion 158 by a gap 160 to define a third portion 162 of opening 112 between first portion 122 of opening 112 and second portion 132 of opening 112. In addition, as shown, opening 112, (including first portion 122, second portion 132, and third portion 162) may be, in at least one embodiment, substantially "arrow-shaped" or "A-shaped." Alternatively, opening 112 may have any other shape that enables fastener 100 to function as described herein.

In the exemplary embodiment, body 102 also includes a projecting portion 164 that includes a receiving surface 166 and that extends outwardly away from rear face 108 of body 102 (e.g., substantially parallel to and/or in the direction of centerline 101). In at least some embodiments, receiving surface 166 may extend away from planar portion 104 at an angle 168 relative to centerline 101. Stated another way, receiving surface 166 of projecting portion 164 may be sloped or angled, and this geometry may, as described herein, facilitate engagement of receiving surface 166 with a load restraint attachment, such as a flat hook load restraint attachment.

In addition to these features, projecting portion 164 may also include a notch 170 sized and shaped to receive and engage another type of load restraint attachment, such as a hook (e.g., a square hook, a tubular hook, etc.) In at least some implementations, notch 170 may extend at least partially into a thickness or depth 172 of projecting portion 164, as shown.

Accordingly, in the exemplary embodiment, load restraint fastener 100 includes a unique geometry that is formed with a plurality of geometric features shaped to receive a plurality of different load restraint attachments, including but not limited to, flat hook attachments, tubular and/or other shaped hook attachments, chain-link attachments, and the like. For example, load restraint fastener 100 may include, as described in detail above, various receiving portions (e.g., first receiving portion 114, second receiving portion 124, and projecting portion 164), openings (e.g., first portion 122, second portion 132, and third portion 162), notches (e.g., notches 138, 142, 148, 152, and/or 170), and the like, different combinations of which may be used to receive and engage different types and/or kinds of load restraint attachments. Accordingly, load restraint fastener 100 may function as a universal load restraint fastener capable of operation with many different types of load restraint attachments, as described in additional detail below.

Figure 3:
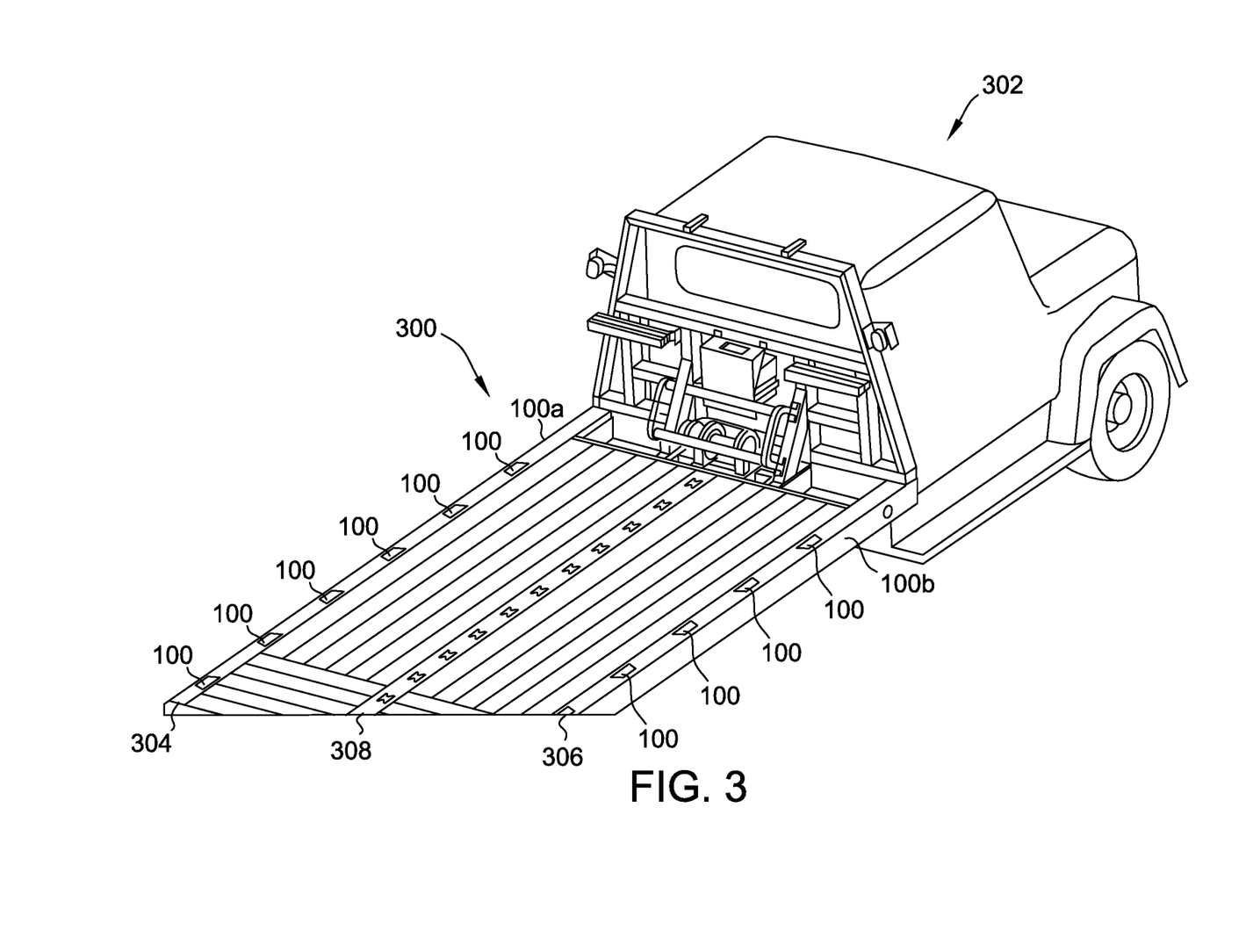
FIG. 3 is a perspective view of an exemplary load-bearing platform that includes a plurality of load restraint fasteners, such as those shown in FIGS. 1 and 2.

FIG. 3 is a perspective view of an exemplary load-bearing platform 300, such as a trailer attached to a vehicle 302, which may be used with one or more load restraint fasteners 100 (shown in FIGS. 1 and 2). More particularly, in the exemplary embodiment, platform 300 includes one or more elongate members, including a first elongate member 304 and/or a second elongate member 306, each of which may include a plurality of load restraint fasteners 100.

Specifically, as shown, first elongate member 304 may be spaced apart and separated from second elongate member 306 by a bed 308. In addition, load restraint fasteners 100 may be installed or formed in first elongate member 304 and second elongate member 306 in regularly spaced intervals, such that pairs of load restraint fasteners 100, such as a first pair 100a and 100b, are arranged substantially opposite one another at opposite sides of bed 308. This alternating, regularly spaced, arrangement of pairs of load restraint fasteners 100 may continue over all or a part of the length of first and second elongate members 304 and 306.

As a result, in operation, straps and/or other load restraints, such as chains, flat hooks, and other hooked and/or variously shaped load restraint attachments, may be mechanically coupled between adjacent pairs of load restraint fasteners 100, such as first pair 100a and 100b. Likewise, load restraints may be coupled between non-adjacent load restraint fasteners 100, such as for example, to create crisscrossed and/or other suitable connections of load restraints over and/or around bed 308 for the purpose of securing a load on bed 308, and the like.

Moreover, as described in additional detail below, in some implementations, load restraint attachments of different types may be fitted to or coupled on opposite ends of a respective load restraint (e.g., a particular strap or cord) and coupled on desired load restraint fasteners 100, irrespective of the fact that the strap or cable may include attachments (e.g., flat hooks, tubular hooks, chain links) on opposite ends. In other words, load restraint fasteners 100 may enable the use of load restraints having different types of attachments at their respective ends—a feature useful when different attachment types may be suitable for different conditions, different load, and the like.

Similarly, in at least some embodiments, a single load restraint fastener 100 may receive and engage with two or more load restraint attachments. For example, two load restraint attachments, such as two chain-links 1002, may be simultaneously engaged or coupled with a given load restraint fastener 100, such as in different receiving portions 114 and/or 124. Likewise, a single load restraint fastener 100 may engage with multiple types of load restraint attachments (e.g., attachments 600, 800, and/or 1000) at the same time. For example, in at least one embodiment, load restraint fastener 100 may engage with one or more chain-links 1002, as described above, as well as within a flat-hook attachment 600, a tubular or other-shaped hook attachment 800, and the like (as described in additional detail below). Accordingly, in various embodiments, load restraint fastener 100 may engage or couple with more than a single load restraint attachment 600, 800, and/or 1000, as well as more than a single type or kind of load restraint attachment 600, 800, and/or 1000, at the same time. Stated another way, multiple load restraint attachments 600, 800, and/or 1000, whether they are the same type or different types, can be coupled to load restraint fastener 100 at the same time to facilitate a variety of attachments and/or attachment points.

Figure 4:
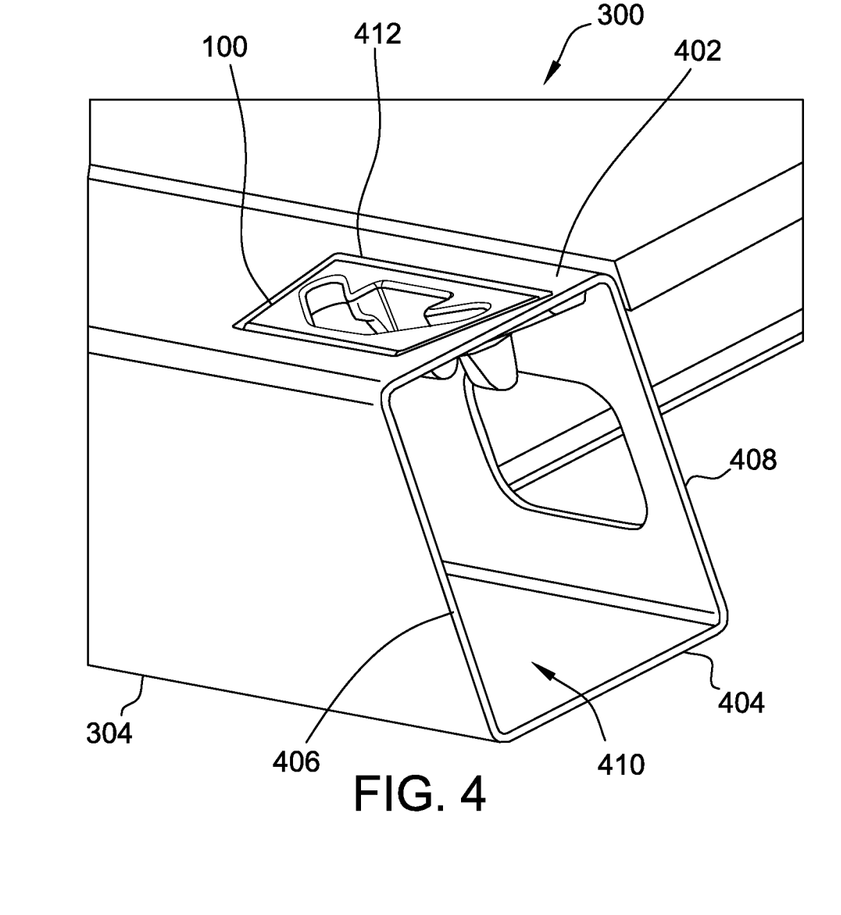
FIG. 4 is a perspective view of an elongate member that may be used with the load bearing platform shown in FIG. 3, including a load restraint fastener, such as those shown in FIGS. 1 and 2.
Figure 5:
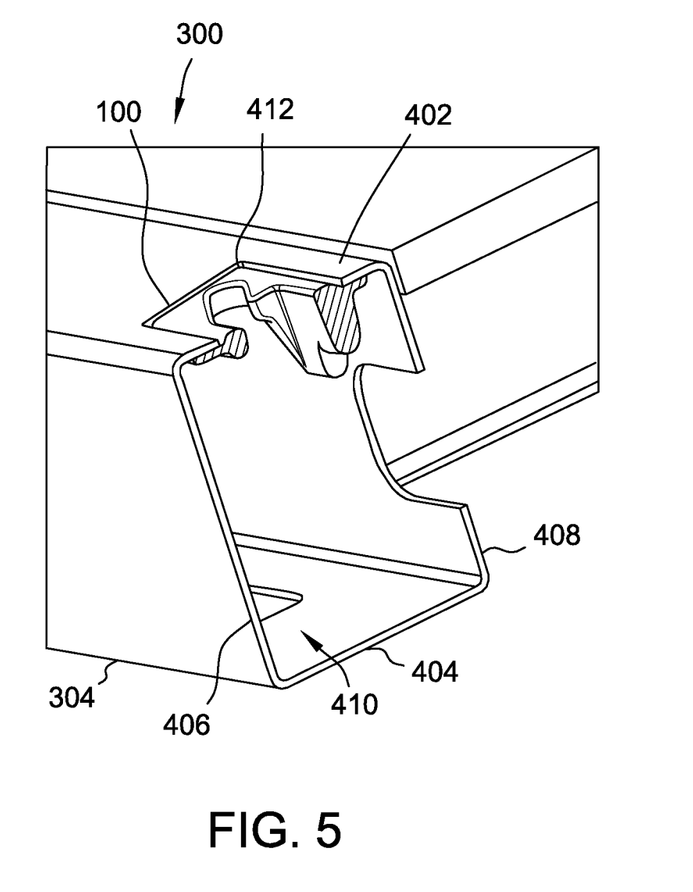
FIG. 5 is a cross-sectional view of the load restraint fastener shown in FIG. 4.

FIG. 4 is a perspective view of first elongate member 304 of load bearing platform 300 (shown in FIG. 3), including a load restraint fastener 100 (shown in FIGS. 1 and 2). FIG. 5 is a cross-sectional view of first elongate member 304 and load restraint fastener 100 (shown in FIG. 4). As described above, elongate members 304 and 306 may include a plurality of load restraint fasteners 100. However, FIGS. 4 and 5 are intended to illustrate a close-up view of one such load restraint fastener 100.

Accordingly, as shown, in the exemplary embodiment, elongate member 304 is substantially tubular and includes a top surface 402, a bottom surface 404, and a first side surface 406 and a second side surface 408 extending therebetween to define an interior tubular region 410. An aperture or hole 412 may be included in top surface 402, and load restraint fastener 100 may be inserted within hole 412 and mechanically coupled to elongate member 304. To couple load restraint fastener 100 to elongate member 304, in various embodiments, any known coupling technique, or any combination of known techniques, may be used, such as welding, adhesive, pressure fitting or friction fitting, and the like. In some embodiments, one or more load restraint fasteners 100 can be integrally formed with elongate members 304 and/or 306, such as during manufacture of elongate members 304 and/or 306.

As a result, it can be seen that any of the plurality of load restraint attachments, such as flat hook attachments, tubular or other-shaped hook attachments, chain-links, and the like may be passed through opening 112 of any of the plurality of load restraint fasteners 100 included in elongate members 304 and/or 306 to attach the load restraint attachments to respective load restraint fasteners 100, and thereby, to an elongate member 304 and/or 306. In other words, the plurality of load restraint fasteners 100 included in elongate members 304 and/or 306 may facilitate attachment of load restraints, such as straps, cords, and the like, which may terminate in various load restraint attachments, such as any of the attachments described herein. Loads may, in turn, be secured on bed 308 between elongate members 304 and/or 306 using the one or more load restraint fasteners 100, as described.

Figure 6:
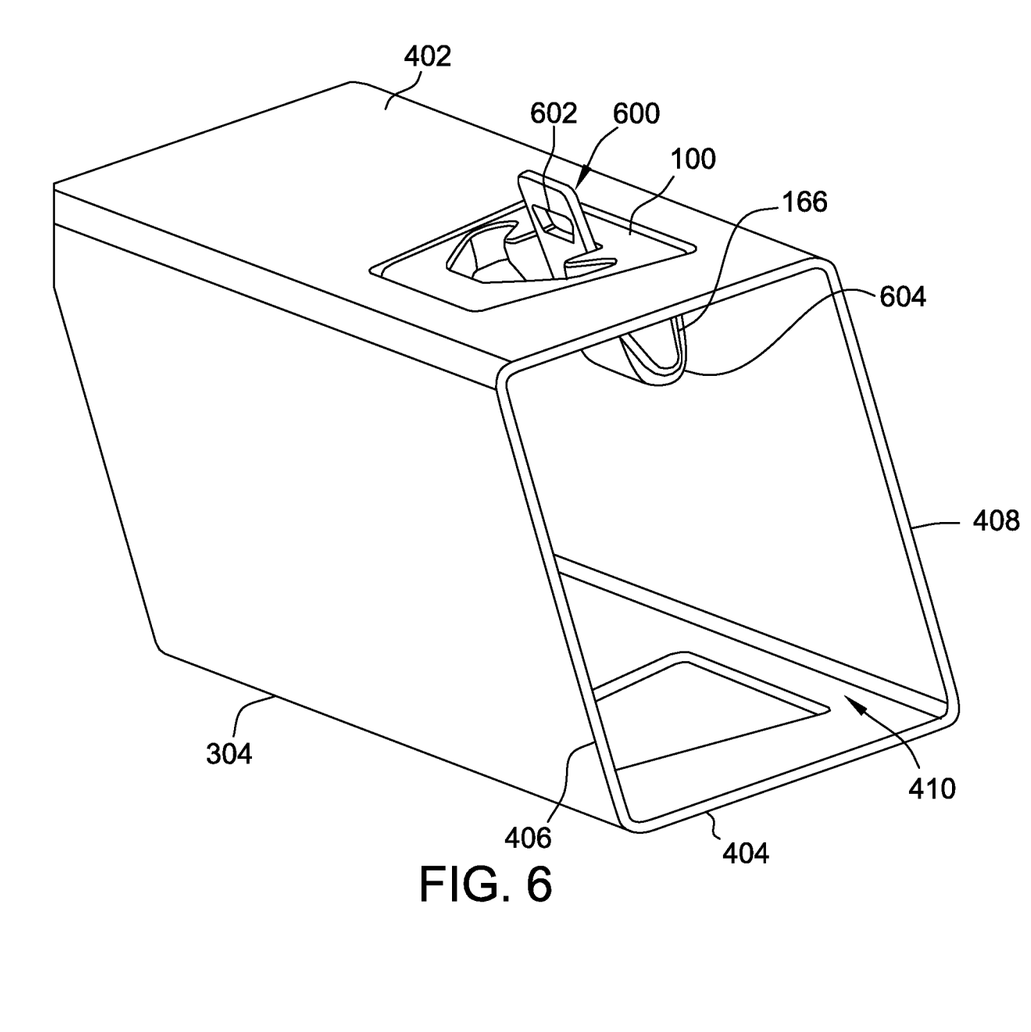
FIG. 6 is a perspective view of an elongate member used with the load bearing platform shown in FIG. 3, and including a load restraint fastener, such as those shown in FIGS. 1 and 2.
Figure 7:
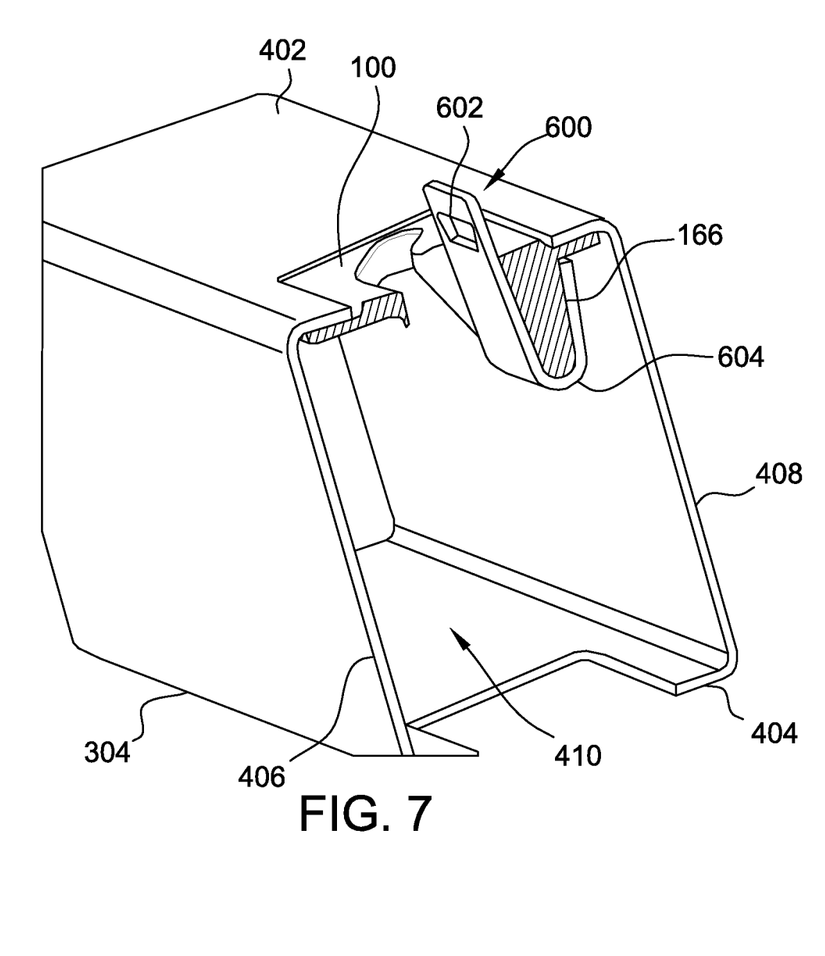
FIG. 7 is a cross-sectional view of the load restraint fastener shown in FIG. 6 and coupled to a flat hook of a load restraint attachment.

Accordingly, with reference now to FIGS. 6-11, different load restraint attachments are illustrated in engagement with an example load restraint fastener 100. Specifically, FIG. 6 is a perspective view of elongate member 304 of the exemplary load bearing platform 300 (shown in FIG. 3), including a load restraint fastener 100 (as shown in FIGS. 1 and 2), and in which load restraint fastener 100 is coupled to load restraint attachment 600 that includes a flat hook (or a "flat-hook load restraint attachment"). Likewise, FIG. 7 is a cross-sectional view of the load restraint fastener 100 shown in FIG. 6 coupled to the flat-hook load restraint attachment 600.

In the exemplary embodiment, a load restraint, such as a strap or cable (not shown), may couple to load restraint attachment 600 at a restraint-end 602. Load restraint attachment 600 may also include a flat-shaped hook 604, as shown, that substantially conforms to receiving surface 166 of projecting portion 164 of load restraint fastener 100. In operation, it will be appreciated that the flat-shaped hook 604 engages with or "hooks over" receiving surface 166, as shown. Load restraint fastener 100 may thus be used with a load restraint attachment having a flat-hook end, such as load restraint attachment 600. Stated another way, load restraint fastener 100 can be used to engage and secure a load restraint attachment 600 including a flat-shaped hook 604.

Figure 8:
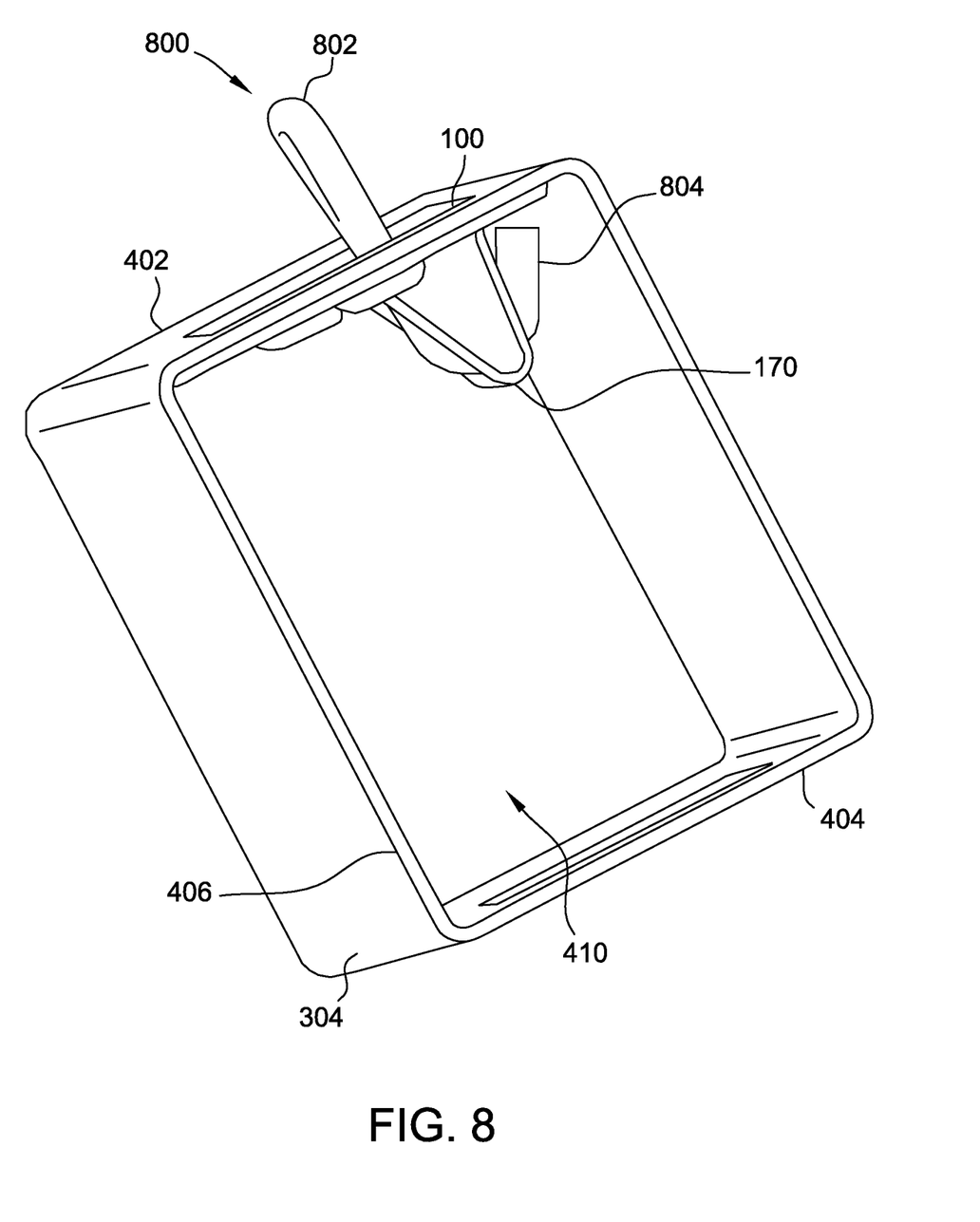
FIG. 8 is a perspective view of an elongate member used with the load bearing platform shown in FIG. 3, including a load restraint fastener, such as those shown in FIGS. 1 and 2, coupled to a hook of a load restraint attachment.
Figure 9:
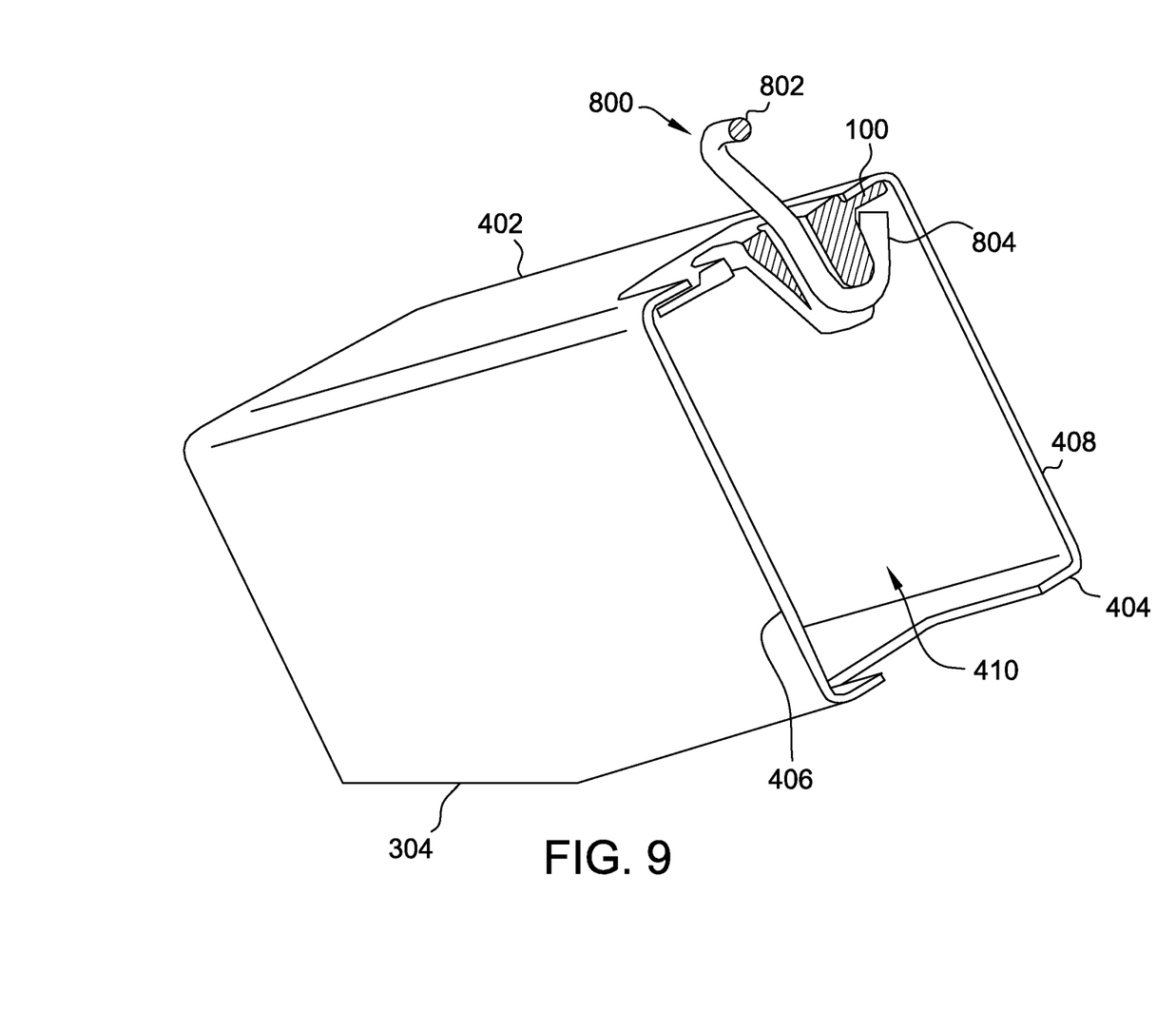
FIG. 9 is a cross-sectional view of the load restraint fastener shown in FIG. 8 and coupled to the hook of the load restraint attachment.

FIG. 8 is a perspective view of elongate member 304 of the exemplary load bearing platform 300 (shown in FIG. 3), including a load restraint fastener 100 (as shown in FIGS. 1 and 2), and in which the load restraint fastener 100 is coupled to load restraint attachment 800 having a hook-end, such as a tubular hook-end (or "hook-end load restraint attachment"). FIG. 9 is a cross-sectional view of the exemplary load restraint fastener 100 shown in FIG. 8 coupled to the hook-end load restraint attachment 800.

In the exemplary embodiment, a load restraint, such as a strap or cable (not shown), may couple to load restraint attachment 800 at a restraint-end 802. Load restraint attachment 800 may also include a hook-end 804, as shown, having a tubular or other-shaped hook (e.g., a square or other rectilinear hook, etc.) In at least some embodiments, hook-end 804 may substantially conform to notch 170 of projecting portion 164, although in other embodiments, the respective shapes of hook-end 804 and notch 170 are not necessarily congruent. In operation, it will therefore be appreciated that hook-end 804 engages with or "hooks over" notch 170, as shown. Load restraint fastener 100 may thus also be used with a load restraint attachment having a hook-end, such as load restraint attachment 800. Stated another way, load restraint fastener 100 can be used to engage and secure a load restraint attachment 800 including a hook-end 804 having any of a variety of suitable hooked or similar shapes.

Figure 10:
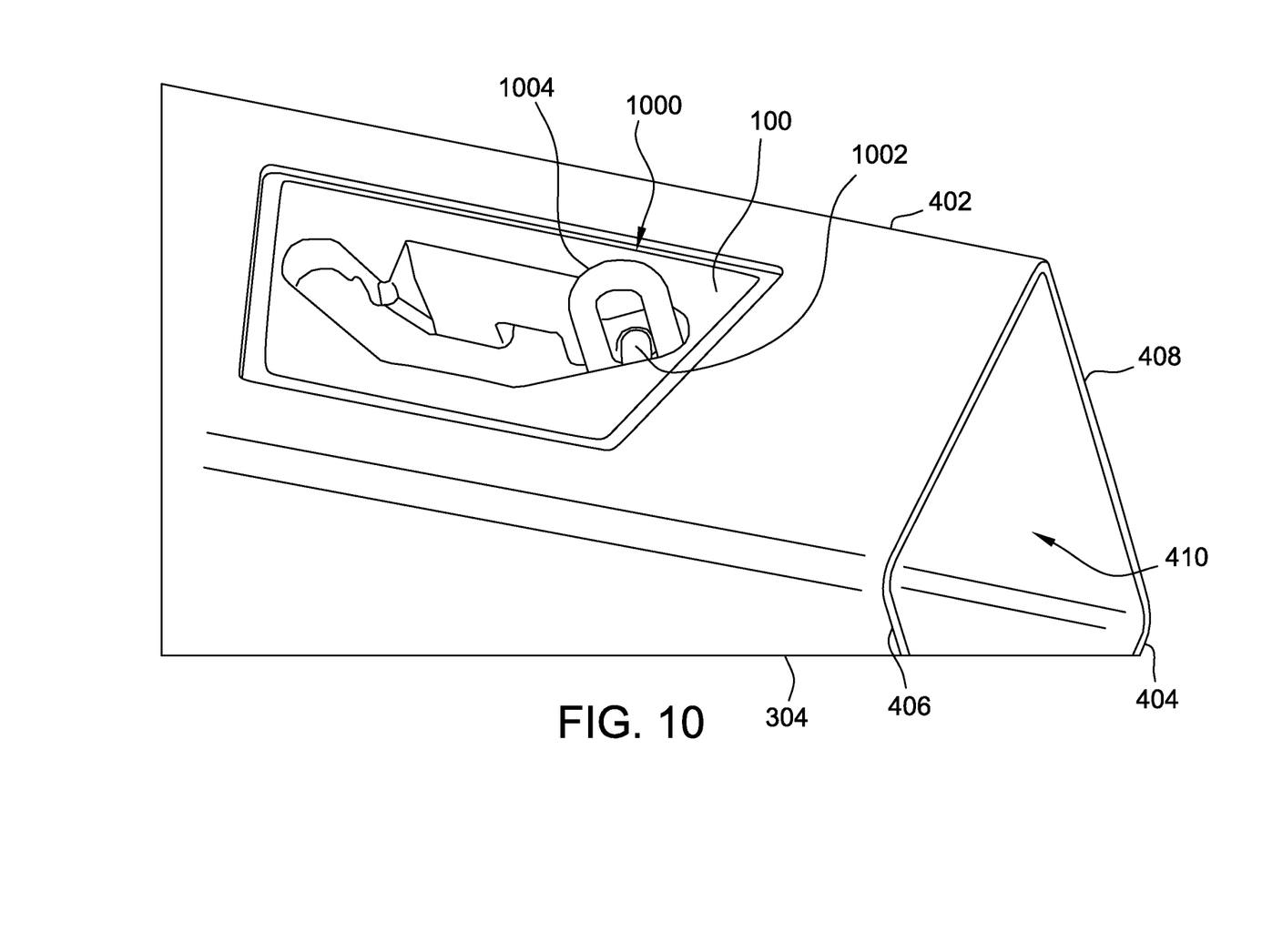
FIG. 10 is a perspective view of an elongate member of the load bearing platform shown in FIG. 3, including a load restraint fastener, such as those shown in FIGS. 1 and 2, and in which the load restraint fastener is coupled to chain-link of a load restraint attachment.
Figure 11:
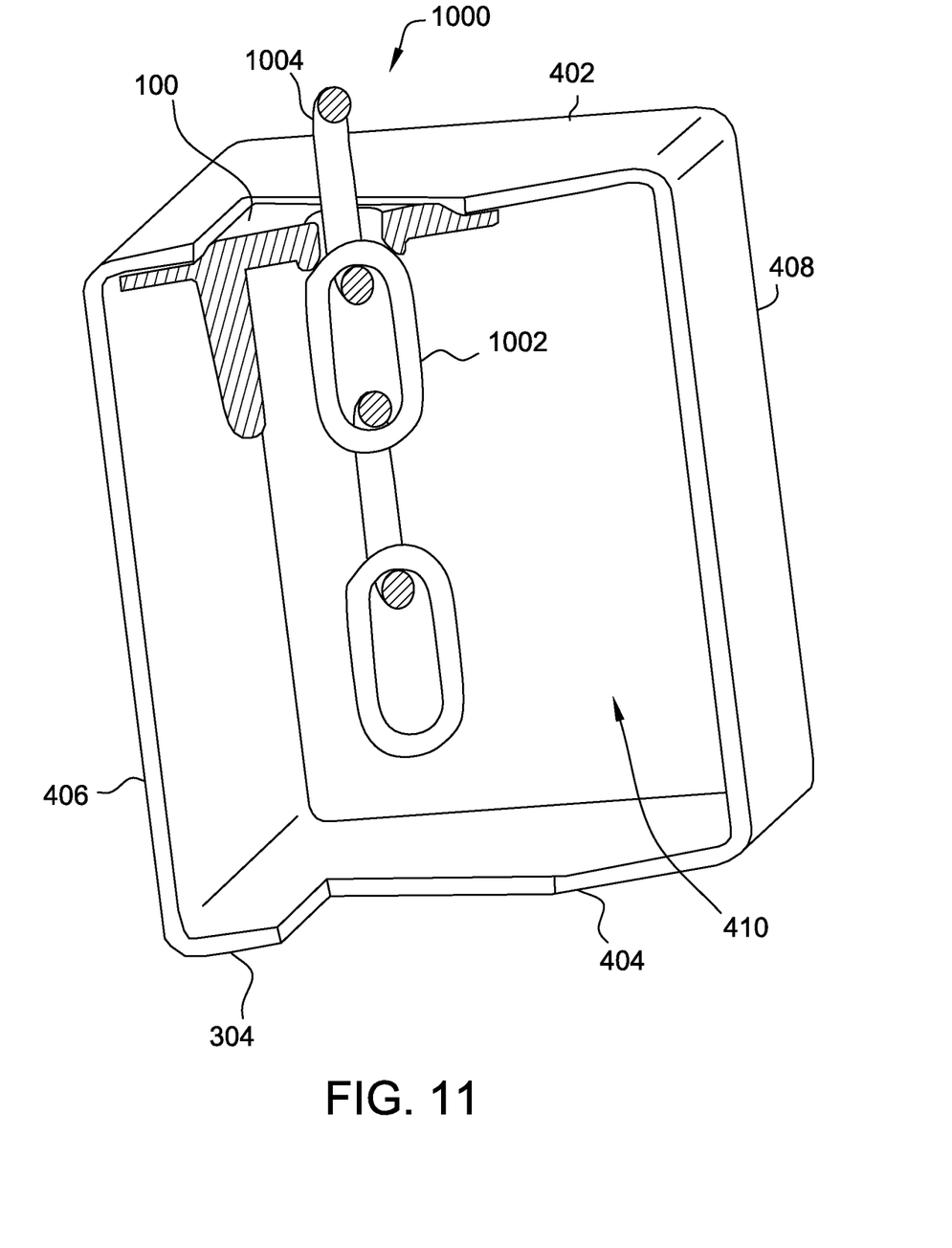
FIG. 11 is a cross-sectional view of the load restraint fastener shown in FIG. 10 and coupled to the chain-link of the load restraint attachment.

FIG. 10 is a perspective view of elongate member 304 of the exemplary load bearing platform 300 (shown in FIG. 3), including a load restraint fastener 100 (as shown in FIGS. 1 and 2), and in which the load restraint fastener 100 is coupled a load restraint attachment 1000 that includes at least one chain-link 1002. In some embodiments, the load restraint is a chain comprising a plurality of chain-links, such as chain-link 1002. In other embodiments, however, the load restraint may include another restraint type, such as a rope, a cable, a strap, and the like having one or more chain-links 1002 coupled to an end thereof. FIG. 11 is a cross-sectional view of the exemplary load restraint fastener 100 shown in FIG. 10 coupled to the chain-link 1002 of the load restraint attachment 1000.

Accordingly, load restraint attachment 1000 may include at least one chain-link 1002, as shown. The chain-link 1002 may be received by and/or engage with either of first receiving portion 114 and/or second receiving portion 124, as described above. More particularly, load restraint attachment 1000 may engage on either side of load restraint fastener 100 within first receiving portion 114 and/or second receiving portion 124. An operator or individual securing load restraint attachment 1000 may select a most convenient location, depending, for example, on a position or orientation of attachment 1000, a location of fastener 100, various environmental factors, and the like. As a result, however, it will be appreciated that load restraint fastener 100 provides several options, such as on the right side and left side (e.g.,  first receiving portion 114 on one side and second receiving portion 124 on the other side) for engaging or coupling load restraint attachment 1000.

Accordingly, in at least one implementation, chain-link 1002 may be received on one side of fastener 100 between first notch 138 and second notch 142 of first receiving portion 114. As described above, first notch 138 and second notch 142 are included in first arcuate segment 136 of first receiving portion 114, which may be sized and shaped to engage and restrain chain-link 1002 therein.

More particularly, first notch 138 and second notch 142 may extend from rear face 108 of body 102 some distance into thickness 110 thereof without reaching front face 106 of body 102, such that chain-link 1002 inserted between notches 138 and 142 is restrained and/or substantially prevented from sliding all the way through first arcuate segment 136. In addition, as shown, another chain-link 1004 coupled to chain-link 1002 may be oriented approximately ninety degrees relative to chain-link 1002, such that chain-link 1004 lays substantially flat on receiving surface 120 within first arcuate segment 136. As a result, load restraint fastener 100 is capable of being used with one or more chain-links 1002 and/or 1004. Stated another way, load restraint fastener 100 can be used to engage and secure a load restraint attachment 1000 including one or more chain-links 1002 and/or 1004.

Similarly, in at least one implementation, chain-link 1002 may be received on the other side of fastener 100 between first notch 148 and second notch 152 of second receiving portion 124. As described above, first notch 148 and second notch 152 are included in second arcuate segment 146 of second receiving portion 124, which may be sized and shaped to engage and restrain chain-link 1002 therein.

More particularly, first notch 148 and second notch 152 may extend from rear face 108 of body 102 some distance into thickness 110 thereof without reaching front face 106 of body 102, such that chain-link 1002 inserted between notches 148 and 152 is restrained and/or substantially prevented from sliding all the way through second arcuate segment 146. In addition, as shown, another chain-link 1004 coupled to chain-link 1002 may be oriented approximately ninety degrees relative to chain-link 1002, such that chain-link 1004 lays substantially flat on receiving surface 130 within second arcuate segment 146. As a result, load restraint fastener 100 is capable of being used with one or more chain-links 1002 and/or 1004. Stated another way, load restraint fastener 100 can be used to engage and secure a load restraint attachment 1000 including one or more chain-links 1002 and/or 1004.

Moreover, as described above, load restraint fastener 100 can be used to engage and secure load restraint attachment 1000 on either side thereof, such as within first arcuate segment 136 as well as within second arcuate segment 146. As a result, fastener 100 provides several options for coupling a load restraint attachment 1000, such as a chain, therein.

A load restraint fastener for use with a variety of load restraint attachments, such as flat- and other-shaped hook attachments, chain-link attachments, and the like, is thus described. The load restraint fastener may include a substantially planar portion, which may define a shaped opening, and a projecting portion extending from a rear or bottom surface of the planar portion. The fastener may, in addition, include a variety of receiving surface, notches, and other surface features, each of which may individually and/or in combination with one or more other surface features, facilitate engagement with and securing of one or more of the plurality of load restraint attachments.

Accordingly, the load restraint fastener may be implemented in association with any suitable load-bearing structure, such as a trailer and/or truck bed, to provide a tie-down or restraint securing location. In addition, a plurality of load restraint fasteners may be coupled to a load-bearing structure to provide a variety of restraint attachment connection points, each of which may facilitate coupling a load restraint, such as a strap, a cable, a rope, a chain, and/or any other restraint type having one or more of the load restraint attachments described herein to and/or between pairs of the load restraint fasteners. For example, in at least one embodiment, a pair of load restraint fasteners may be provided in spaced apart relation to one another and separated by a load-bearing platform, such as a trailer bed. A load restraint, such as a strap, having load restraint attachments, such as hooks, flat-hooks, and/or chain-links, coupled to the ends thereof, may be secured between the pair of load restraint fasteners to further secure a load relative to the load restraint on the trailer bed.

The load restraint fastener, as described herein, is thus universally interoperable with a variety of types of load restraint attachments. Likewise, the load restraint fastener, as described herein, can be used with any of a wide variety of load bearing structures to secure loads on and/or relative to the structures, even in circumstances where different types of load restraint attachments are beneficial or otherwise available.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A tie-down fastener for use with a plurality of load restraint attachments, the tie-down fastener including:
    a body including:
        a substantially planar portion including a front face and an opposite rear face, the substantially planar portion including an opening defined therein, the substantially planar portion including:
            a first receiving portion having a receiving surface, the first receiving portion defining a first portion of the opening; and
            a second receiving portion having a receiving surface, the second receiving portion spaced apart from the first receiving portion, the second and first receiving portions in a mirrored relationship about at least one axis of symmetry, the second receiving portion defining a second portion of the opening, the first receiving portion and the second receiving portion configured to receive at least a first kind of load restraint attachment; and
        a projecting portion having a receiving surface, the projecting portion extending outwardly from the rear face of the substantially planar portion, the projecting portion configured to receive at least a second kind of load restraint attachment.

2. The tie-down fastener of claim 1, wherein the substantially planar portion further includes:
    a first connecting portion extending between a first end of the first receiving portion and a first end of the second receiving portion; and
    a second connecting portion extending between a second end of the first receiving portion and a second end of the second receiving portion, the first connecting portion spaced apart from the second connecting portion such that a third portion of the opening is defined therebetween.

3. The tie-down fastener of claim 1, wherein the first receiving portion includes a first arcuate segment that extends at least partially between a first end and a second end thereof, and wherein the second receiving portion includes a second arcuate segment that extends at least partially between a first end and a second end thereof.

4. The tie-down fastener of claim 1, wherein the first receiving portion extends at a first angle relative to the axis of symmetry, and wherein the second receiving portion extends at a second angle relative to the axis of symmetry, and wherein the first angle is the same as the second angle.

5. The tie-down fastener of claim 1, wherein the first receiving portion further includes at least one notch formed in the receiving surface thereof, the at least one notch shaped and sized to receive a chain-link of a load restraining chain.

6. The tie-down fastener of claim 1, wherein the first receiving portion further includes:
    a first arcuate segment extending at least partially between a first end and a second end of the first receiving portion;
    a first notch formed in a first part of the first arcuate segment; and
    a second notch formed opposite the first notch in a second part of the first arcuate segment, the first notch and the second notch sized and shaped to cooperatively receive and engage a chain-link of a load restraining chain.

7. The tie-down fastener of claim 1, wherein the receiving surface of the projecting portion is sized and shaped to receive and engage a substantially planar hook of a load restraint attachment.

8. The tie-down fastener of claim 1, wherein the receiving surface of the projecting portion extends outwardly from the substantially planar portion at an acute angle relative to a centerline of the tie-down fastener.

9. The tie-down fastener of claim 1, wherein the receiving surface of the projecting portion further includes a notch that is sized and shaped to receive and engage a hook of a load restraint attachment.

10. The tie-down fastener of claim 1, wherein the opening is arrow-shaped.

11. A load restraint fastener comprising:
    a body defining an opening arranged to receive at least one type of load restraint attachment, the body including:
        a first receiving portion having a first end, a second end, and a receiving surface extending therebetween, the first receiving portion defining a first portion of the opening;
        a second receiving portion having a first end, a second end, and a receiving surface extending therebetween, the second receiving portion spaced apart from the first receiving portion, the second receiving portion defining a second portion of the opening;
        a first connecting portion extending between and connecting the first end of the first receiving portion and the first end of the second receiving portion; and a second connecting portion extending between and connecting the second end of the first receiving portion and the second end of the second receiving portion, the second connecting portion spaced apart from the first connecting portion; and a projecting portion coupled to the second portion and extending away from the second portion, the projecting portion including a first end, a second end, and a receiving surface extending therebetween.

12. The load restraint fastener of claim 11, wherein the second connecting portion is spaced apart from the first connecting portion to define a third portion of the opening intermediate the first portion of the opening and the second portion of the opening.

13. The load restraint fastener of claim 11, wherein the first receiving portion includes a first arcuate segment extending at least partially between the first end and the second end thereof, and wherein the second receiving portion includes a second arcuate segment extending at least partially between the first end and the second end thereof.

14. The load restraint fastener of claim 11, wherein the first receiving portion is recurved, and wherein the second receiving portion is recurved.

15. The load restraint fastener of claim 11, wherein the first receiving portion further comprises at least one notch formed in the receiving surface thereof, the at least one notch shaped and sized to receive and engage a chain-link of a load restraining chain.

16. The load restraint fastener of claim 11, wherein the first receiving portion further includes:
    a first arcuate segment extending at least partially between the first end and the second end of the first receiving portion;
    a first notch formed in a first part of the first arcuate segment; and
    a second notch formed opposite the first notch in a second part of the first arcuate segment, the first notch and the second notch sized and shaped to cooperatively receive and engage a chain-link of a load restraining chain.

17. The load restraint fastener of claim 11, wherein the receiving surface of the projecting portion is sized and shaped to receive and engage a flat hook of a load restraint attachment.

18. The load restraint fastener of claim 11, wherein the receiving surface of the projecting portion further includes a notch sized and shaped to receive and engage a hook of a load restraint attachment.

19. A load-bearing platform comprising:
a bed arranged to carry a load; and
a first elongate member extending relative to the bed, the first elongate member including at least a first tie-down fastener, the first tie-down fastener comprising:
    a body including:
        a substantially planar portion having a front face and a rear face, the substantially planar portion defining an opening, the substantially planar portion including:
            a first receiving portion having a receiving surface, the first receiving portion defining a first portion of the opening; and
            a second receiving portion having a receiving surface, the second receiving portion spaced apart from the first receiving portion and symmetric with the first receiving portion about at least one axis of symmetry, the second receiving portion defining a second portion of the opening; and
        a projecting portion having a receiving surface, the projecting portion extending outwardly from the rear face of the substantially planar portion.

20. The load-bearing platform of claim 19, further comprising a second elongate member spaced apart from the first elongate member and separated from the first elongate member by the bed, the second elongate member extending relative to the bed, the second elongate member including at least a second tie-down fastener, the second tie-down fastener comprising:
    a body including:
        a substantially planar portion having a front face and a rear face, the substantially planar portion defining an opening, the substantially planar portion including:
            a first receiving portion having a receiving surface, the first receiving portion defining a first portion of the opening; and
            a second receiving portion having a receiving surface, the second receiving portion spaced apart from the first receiving portion and symmetric with the first receiving portion about at least one axis of symmetry, the second receiving portion defining a second portion of the opening; and
        a projecting portion having a receiving surface, the projecting portion extending outwardly from the rear face of the substantially planar portion.

* * * * *